9217X
N. Bushnell,
Comb.
No.
Patented Oct. 31. 1835.
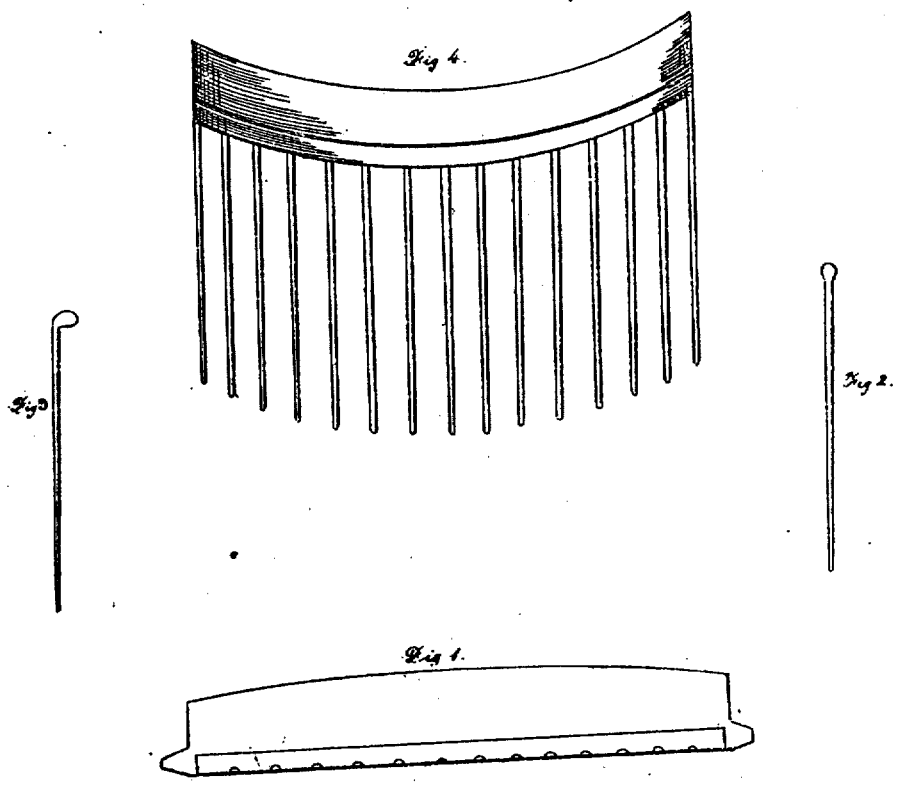

9217X Oct. 31, 1835

Nathaniel Bushnell of Middletown, Conn^t.

Letters Patent

The schedule referred to in these Letters Patent, and making part of the same containing a description in the words of the said Nathaniel Bushnell himself of his improvement in the metallic Hair Comb.

---

To all to whom these presents shall come - Be it known that I Nathaniel Bushnell of Middletown in the County of Middlesex & State of Connecticut have invented a new & useful improvement in the manufacture of ladies metallic hair combs, which I denominate Ladies improved metallic hair comb - and that the following is a full & exact description thereof. The best materials are tin for the top of the comb and iron wire for the teeth, tho' other materials may be used. The comb may be of any size & proportions and is manufactured as follows, to wit, a piece of tin of suitable length and about one eight of an inch wider than the intended width of the top of the comb, having at each end a projection about one eight of an inch in width and extending about one eight of an inch beyond the ends of the top, the lower sides of the projections being nearly on a line with the lower side of the top and so shaped that they may be bent and laid smooth over the end teeth and within the lower part of the top of the comb which is turned over and laid upon the tops of the teeth to hold them firm in their places as hereinafter mentioned, forms the top of the comb, about one eight of an inch in width of the lower part of the top of the comb is turned up and the edgs brought within about one eight of an inch of the inner side of the top - Holes of a suitable size and at the requisite distance from each other are made through the lower part of the top of the comb at the bottom of the bend before mentioned, for the teeth except the end teeth, the teeth being cut of suitable length and the upper end flattened & tinned are inserted in the holes, and the end teeth the tops being flattened and tinned and turned a little inward. The projections before mentioned are bent in[illegible] and laid closely over the end teeth so as to hold them in their places, the teeth being confined in their places - The bottom part of the top of the comb & the projections are hammered down smooth and these & the teeth are all secured

9217X in their places by sodder. The teeth are then pointed and the ends made smooth
The comb is then bent with a greater or less curve as may be desired.
The top and the teeth are painted in imitation of tortoise shell or any other
colour & varnished three or more times, or may be ornamented at pleasure in
any other manner. The advantages by which this comb is distinguished from
& preferable to all others are - First, the lightness strength & durability of the ma-
terials - Second, the manner in which the parts are put together, & secured & shaped
into a regular & even curve - Third, the manner in which the end teeth are inserted
and secured - fourth, the fact that the teeth do not injure the hair -
Fifth the cheapness of the comb compared with its usefulness & durability. It is
to be expressly understood that I do not claim as my invention the materials
used in the manufacture of this comb nor the manner in which the teeth
other than the two end teeth are inserted & secured, nor the painting & varnish
-ing, nor the ornamenting the same, nor the size shape nor proportions in
which the comb may be made, nor the manner in which the parts may
be put together, nor any, nor either of these separate from & disconnected with
others, excepting the manner in which the two end teeth are inserted and
secured - What I do claim as my own invention and not previously
known in the above described comb is the manner in which the two end
teeth are inserted & secured, and the combining this and the materials used
with the manner in which the other teeth are inserted & secured, and all
the parts put together & ornamented in imitation of shell or otherwise & thereby
producing a comb which for lightness, strength, beauty, pleasantness in wearing
doing no injury to the hair; durability & cheapness is preferable to any other comb
before known. Fig. 1 in the annexed drawing represents the top of the comb
prepared for inserting the teeth - Figure 2. represents the teeth other than the
end teeth. Fig. 3. represents the end teeth. Fig. 4. represents the comb complete for
painting or ornamenting - In testimony that the above & foregoing is a
true Specification of my improvement as above described, I have hereto set
my hand this 12th day of October A.D. 1835.

Witnesses
Geo. W. Stanley
Luke C. Lyman

Nathaniel Bushnell

Patented Octo. 31. 1835.

[illegible]